United States Patent Office 2,993,755
Patented July 25, 1961

2,993,755
PREPARATION OF TUNGSTIC OXIDE
William H. Redanz, Niagara Falls, N.Y., assignor to Union Carbide Corporation, a corporation of New York
No Drawing. Filed Aug. 13, 1958, Ser. No. 754,717
3 Claims. (Cl. 23—140)

This invention relates to a method of producing tungstic oxide of controlled particle size.

In the field of powder metallurgy, it is extremely important that the particles of powdered metal or metal compounds subjected to the necessary compacting processes be within a certain size range. For example, if the metal powders are too fine, it is extremely difficult to form a compact which will withstand handling during further treatment. Bonding agents are necessary in such cases, and when the pellets formed are later subjected to heat-treatment, these agents may decompose and contaminate the product. Conversely, if the particle size of the metal powders is overlarge, desired reactions between the powdered metal or metal compounds and other constituents in the pellet may not go to completion or may be too slow.

The particle size of some metal or metal compound powders may be controlled by grinding, but this is a costly and time-consuming operation. Further, the metal powders subjected to grinding may be too ductile, in which case no reduction of particle size is possible.

Ammonium paratungstate, $(NH_4)_6W_7O_{24} \cdot 6H_2O$, is a well known commercial tungsten product widely used as an intermediate compound in the production of tungsten and tungstic oxide. Ammonium paratungstate is most commonly produced by precipitation from an ammonium tungstate solution by the addition of hydrochloric acid thereto. When the precipitate is calcined to produce tungstic oxide, the particle size of the product has generally ranged from 7 to 20 microns. These particle sizes are too great for many applications wherein a particle size of 1.0 to 5.0 microns is desirable.

It is, therefore, the primary object of the present invention to provide a method of producing tungstic oxide of controlled particle size. Other objects, features, and advantages are to provide such a method whereby tungstic oxide powders having improved properties for powder metallurgical applications may be produced, and whereby such powders having controlled particle size may be produced without the necessity of mechanical grinding. Other objects, features, and advantages will be apparent from the following disclosure and appended claims.

The above objects are attained by providing an ammonium tungstate solution, providing in said solution hydrochloric acid in an amount sufficient to lower the pH to a value of between 5.0 and 8.0, and maintaining the solution at a temperature between approximately 15° C. and 50° C. to precipitate ammonium paratungstate. The ammonium paratungstate is then removed from the solution and calcined at a temperature between about 500° C. and 800° C. to remove ammonia and water therefrom. Tungstic oxide will thereby be produced having a particle size of 1.0 to 5.0 microns.

In accordance with the present invention, tungstic oxide of desired particle size may be produced by close control of solution pH and temperature.

EXAMPLE I

As an example of this invention, a sodium tungstate solution normally obtained by the leaching of scheelite or other tungsten ore may be used as a starting point. This solution is treated with hydrochloric acid to produce tungstic acid ($H_2WO_4$) which is then formed into a slurry. Ammonia gas is then bubbled through this slurry to produce an ammonium tungstate (($NH_4$)$_2WO_4$) solution containing approximately 300 grams per liter $WO_3$. This solution is then treated in accordance with the present invention by the addition of a 10 to 16 percent concentrated hydrochloric acid solution whereby the pH is lowered to a value of approximately 7.0. As some heat is generated due to the exothermicity of the reactions involved, it is necessary to cool the solution to maintain a temperature of approximately 15° C. to 50° C. Upon moderate agitation, solid crystals of ammonium paratungstate precipitate from the solution and are filtered out. It has been found that a tendency will occasionally be shown to form a colloidal suspension. In order to prevent such a possibility, one part of nitric acid may be added for every one hundred parts of acid. The ammonium paratungstate obtained is calcined at approximately 600° C. for about 2 hours. The resulting tungstic oxide has a particle size ranging from 1.5 to 3.0 microns and an average particle size of 2.5 microns.

EXAMPLE II

One hundred to two hundred cubic centimeter samples of a stock solution of ammonium tungstate containing approximately 300 grams per liter $WO_3$ were treated in accordance with the invention. Hydrochloric acid concentrations, pH and solution temperatures were varied in accordance with the following table. In each case the precipitant was calcined at approximately 600° C. for approximately 2 hours to achieve the particle size indicated.

Table

| HCl Conc. | Solution pH | Solution Temp., ° C. | Particle Size (microns) |
|---|---|---|---|
| 16.0 | 5.8 | Room temp. | 3.0 |
| 25.0 | 7.1 | 15–25 | 4.9 |
| 16.0 | 7.1 | Room temp. | 1.7 |
| 14.5 | 7.1 | 15–25 | 2.6 |
| 14.5 | 7.1 | 25–30 | 2.5 |
| | 7.1 | 50 | 2.8 |
| 14.5 | 7.6 | 15–25 | 2.0 |
| 10.0 | 7.8 | 15–25 | 1.7 |

EXAMPLE III

As another example of the invention, 400 grams of premium-grade ammonium paratungstate was slurried with 1500 cc. of water and heated to 60 to 70° C. This slurry was added (hot) to 1300 cc. of concentrated chemically pure hydrochloric acid. The slurry was agitated in a 4-liter beaker for 2 to 3 hours at 75 to 80° C. and then allowed to stand for a 24-hour period to settle and cool. After the resulting solution was decanted, a yellow cake (hydrated $H_2WO_4$) resulted which was washed by decantation with 1000 cc. of water. The wash water showed a pH of 2. The resulting wet yellow cake weighed 4640 grams. A hot slurry (45 to 50° C.) of this yellow cake was added to 8 liters of concentrated chemically pure ammonium hydroxide (30 percent) at 45° C. The mixture was digested for 1½ hours at 50 to 55° C. with agitation. Ammonia gas was then bubbled through the solution at a slow rate during digestion. The solution mixture, after cooling, was filtered to produce an ammonium tungstate solution which was then used for an ammonium paratungstate hydrolysis. Two liters of the ammonium tungstate solution were put in an 8-liter battery jar to which were attached mixers. The jar was set in a pan with running water for cooling purposes. A 12 percent, by weight, hydrochloric acid solution (containing 10 ml. concentrated nitric acid per liter hydrochloric acid) was poured into the tungstate solution and agitated until a pH of 7.1 was achieved. Approximately 1730 cc. of acid was added. The temperature was maintained at from 25 to 30° C. as a result of the cooling liquid. After agitating for one hour, the mixture was filtered. The crystals which resulted were dried at 110°C. and then calcined in three batches at 600° C. for two hours with rabbling at one-half hour intervals. Analysis of the product revealed that 424 grams of $WO_3$ were obtained having an average particle size of 2.5 microns.

It will be apparent from the above examples that by careful control of pH and temperature, it is possible to form tungstic oxide powder having a small and determinable particle size. The improvement of the present process over those of the prior art will be readily perceived by those skilled in the art.

What is claimed is:

1. The method of producing tungstic oxide having a particle size between 1.0 and 5.0 microns from an ammonium tungstate solution, which comprises adding to said ammonium tungstate solution hydrochloric acid in an amount sufficient to lower the pH of said solution to a value between 5.0 and 8.0, maintaining said solution at a temperature of between approximately 15° C. and 50° C. to precipate ammonium paratungstate therefrom, removing said ammonium paratungstate from said solution, calcining said ammonium paratungstate at a temperature between about 500° C. and 800° C. for a time sufficient to remove the ammonia and water therefrom to produce said tungstic oxide.

2. The method of producing tungstic oxide having a particle size between 1.0 and 5.0 microns from an ammonium tungstate solution, which comprises adding to said ammonium tungstate solution hydrochloric acid having a concentration of 10 percent to 16 percent by weight in an amount sufficient to lower the pH of said solution to a value between 5.0 and 8.0, maintaining said solution at a temperature of between approximately 15° C. and 50° C. to precipitate ammonium paratungstate therefrom, removing said ammonium paratungstate from said solution, calcining said ammonium paratungstate at a temperature between about 500° C. and 800° C. for a time sufficient to remove the ammonia and water therefrom to produce said tungstic oxide.

3. The method of producing tungstic oxide having a particle size between 1.0 and 5.0 microns from an ammonium tungstate solution, which comprises adding to said ammonium tungstate solution hydrochloric acid in an amount sufficient to lower the pH of said solution to a value between 5.0 and 8.0, adding nitric acid in an amount sufficient to ensure precipitation of ammonium paratungstate, maintaining said solution at a temperature of between approximately 15° C. and 50° C. to precipitate ammonium paratungstate therefrom, removing said ammonium paratungstate from said solution, calcining said ammonium paratungstate at a temperature between about 500° C. and 800° C. for a time sufficient to remove the ammonia and water therefrom to produce said tungstic oxide.

References Cited in the file of this patent

UNITED STATES PATENTS

| | | |
|---|---|---|
| 2,536,768 | Reynolds et al. | Jan. 2, 1951 |
| 2,801,152 | Kasey | July 30, 1957 |

FOREIGN PATENTS

| | | |
|---|---|---|
| 593,906 | Great Britain | Oct. 29, 1947 |

OTHER REFERENCES

Hampel: Rare Metals Handbook, Rheinhold Publ. Corp., N.Y., 1954, pages 486, 487.

Mellor: "Comprehensive Treatise on Inorganic and Theoretical Chemistry," Longmans, Green and Co., N.Y., 1931, vol. XI, pages 812, 814.